March 19, 1957 G. A. LORENTZEN 2,785,649
MACHINE FOR STRINGING CONFECTIONERY
Filed March 4, 1954 4 Sheets-Sheet 2
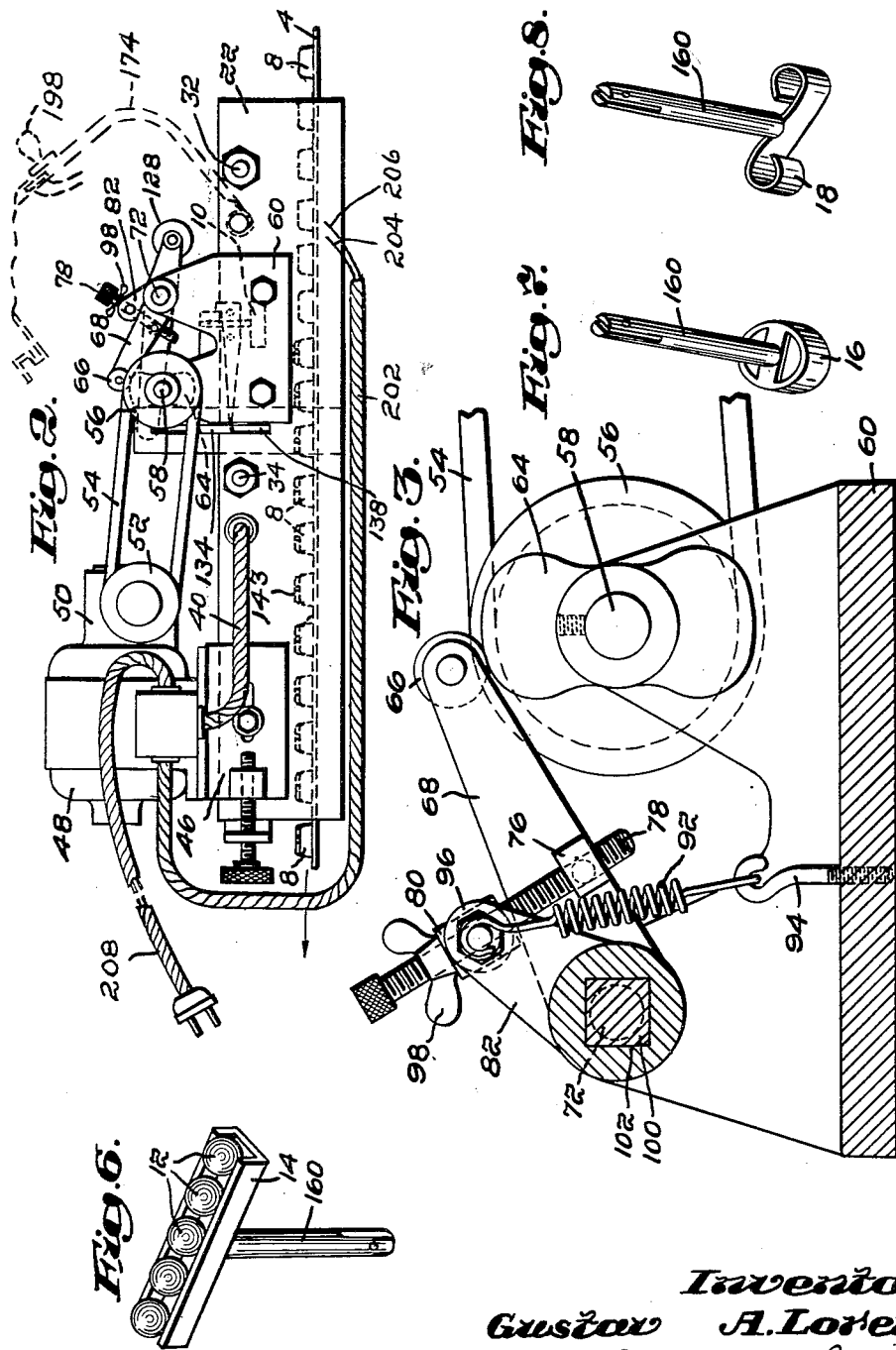
Inventor:
Gustav A. Lorentzen,
by C. Yardley Chittick
Attorney

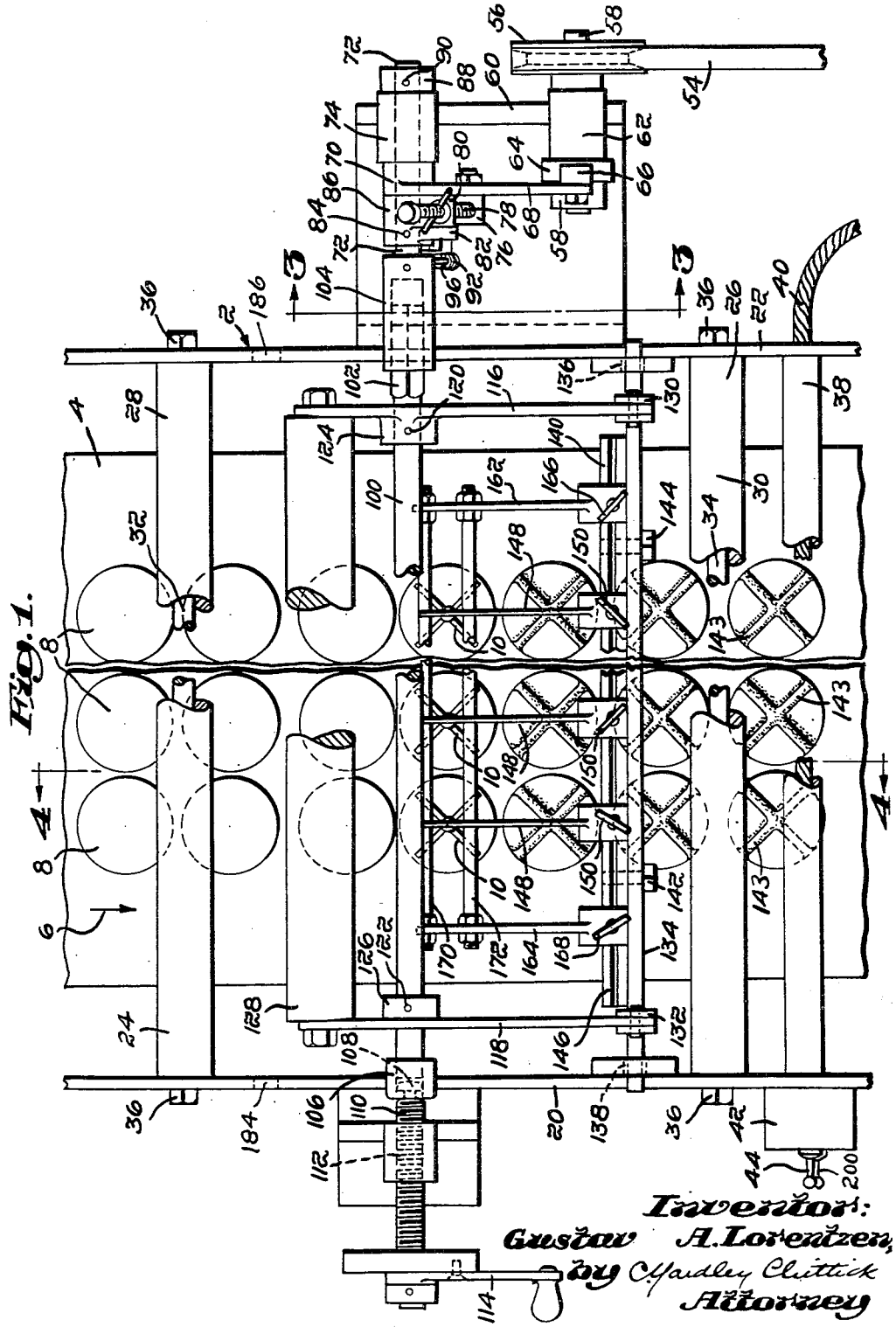

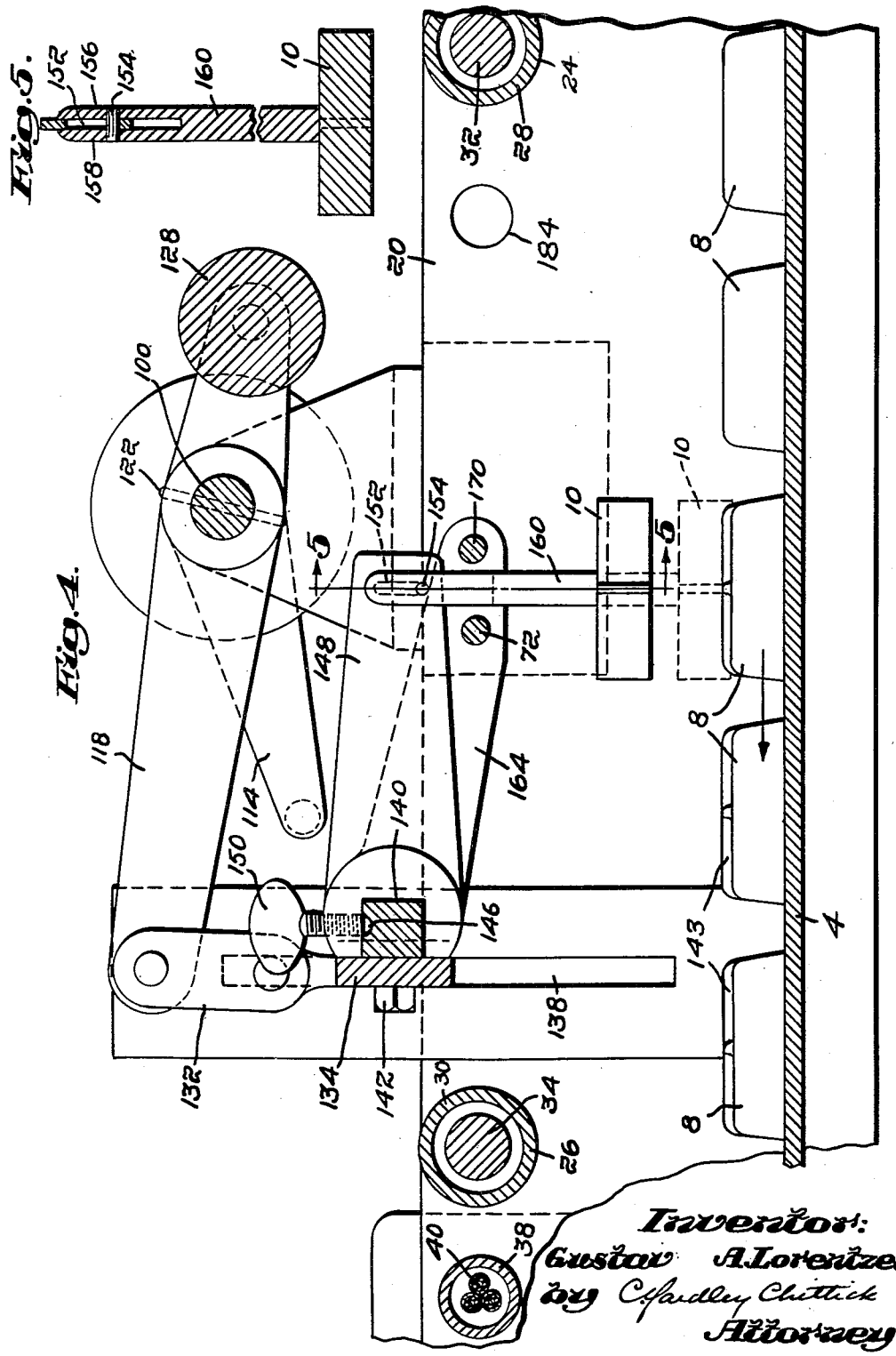

March 19, 1957  G. A. LORENTZEN  2,785,649
MACHINE FOR STRINGING CONFECTIONERY
Filed March 4, 1954  4 Sheets-Sheet 4
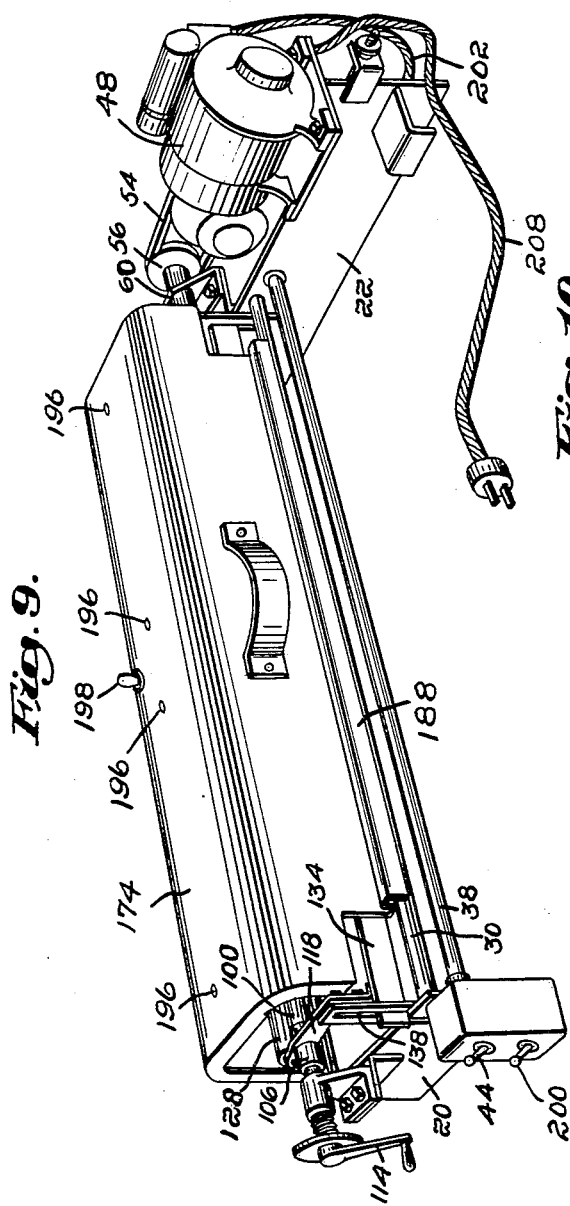
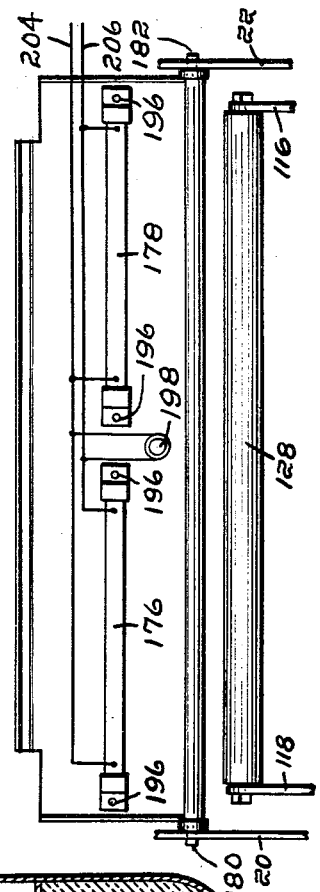
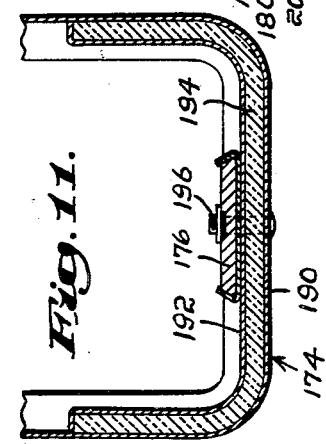
Inventor:
Gustav A. Lorentzen,
by C. Yardley Chittick
Attorney

United States Patent Office 2,785,649
Patented Mar. 19, 1957.

2,785,649

MACHINE FOR STRINGING CONFECTIONERY

Gustav A. Lorentzen, Arlington, Mass., assignor to W. F. Schrafft & Sons Corporation, Charlestown, Mass., a corporation of Massachusetts Application March 4, 1954, Serial No. 413,985

12 Claims. (Cl. 118—14)

This invention relates to confectionery machinery and is particularly concerned with the provision of a machine which will automatically string confectionery.

Stringing confectionery means applying a decorative pattern to the top of a candy while it is in soft deformable condition. While stringing is most generally done to chocolate coated candies, it will be understood that the invention may be used to string any types of candies. Accordingly, when reference is made hereinafter to stringing chocolate coated candies, it will include the stringing of all candies capable of receiving this treatment.

In the stringing operation, the pattern is applied while the chocolate is still soft and as stated is for the purpose of increasing the attractiveness of the confection. The pattern so applied does not have to be of any particular design, but in general, it is preferred that the pattern approximate as nearly as possible that which has heretofore been applied by hand.

In the hand stringing according ot the present practice, the previously prepared centers are placed in rows on a conveyer belt by which they are then carried to a first station where the bottoms of the centers are coated with chocolate and then to a second station where the tops and sides are coated. The coated candies are then transferred to another conveyer belt on which they are aligned with considerable precision. As the candies move on this last conveyer belt to a cooling room, women sitting on opposite sides of the conveyer belt distort with their fingers the soft chocolate on the top of each candy, thereby to produce a pattern of sorts which is considered desirable in the confectionery trade.

The object of the herein claimed invention is to accomplish by a machine of new and novel design substantially the same results heretofore achieved in the above referred to hand-stringing of the candies.

Another object of the invention is to provide a machine which will be capable of functioning to produce the required pattern regardless of the longitudinal spacing of the candies on the conveyer belt and which may be adjusted laterally to bring the stringing elements into alignment with the longitudinal rows of candies as they advance to the stringing elements.

A further object of the invention is to provide a machine so constructed that an entire operating set of pattern applying or stringing elements may be removed from the machine to be replaced by another complete set of elements which may carry a different pattern forming construction whereby it is possible to apply recognizable specific patterns to different types of candies so that the type of center may be recognizable from the pattern so applied.

Another object of the invention contemplates a construction which will permit variation in the lateral spacing of the pattern forming elements so that as the number of longitudinal rows of candies on the conveyer belt may be varied, the number of stringing elements may be correspondingly varied and set for proper alignment with the candies.

A further object of the invention is the provision of stringing mechanism which may be readily cleaned. This is accomplished by having the entire battery of stringing elements of one pattern mounted in such manner that all may be removed together and quickly replaced by another complete battery of stringing elements. The removed set may then be cleaned at the operator's convenience.

Still another object of the invention is the provision of a readily removable cover having on its under side heating elements which will project sufficient warmth to the stringing elements that the confection thereon will remain in a soft condition during normal operation of the unit. The inclusion of the heating elements will prevent building up of the confection on the stringing elements so that the pattern applied to the candies will be of a more uniform character and subsequent cleaning may be facilitated.

These and other objects of the invention will be more clearly understood as the description proceeds with the aid of the accompanying drawings in which Fig. 1 is a plan view of the machine broken away in the center with the missing portion merely being duplications of those elements on either side thereof.

Fig. 2 is a side elevation of the construction shown in Fig. 1 looking from the right thereof and drawn to one-half the scale of Fig. 1, the cover that during operation encloses most of the moving parts is shown open in dotted line position.

Fig. 3 is a section taken on the line 3—3 of Fig. 1.

Fig. 4 is a section in elevation taken on the line 4—4 of Fig. 1 and to double the scale of Fig. 1.

Fig. 5 is a section taken on the line 5—5 of Fig. 4.

Figs. 6, 7 and 8 show three modifications of individual stringing elements with Fig. 6 being inverted for the purpose of clarity of illustration.

Fig. 9 is a perspective view of the complete unit with the heat applying cover in closed position.

Fig. 10 is a plan view of a portion of Fig. 1 showing the cover in open position with the heating elements exposed.

Fig. 11 is a sectional fragmentary view of the cover showing the insulated wall and heating element.

Referring to Fig. 1, it will be seen that the entire stringing unit generally referred to at 2 constitutes a mechanism which extends horizontally over a conveyer belt 4 moving in the direction of the arrow 6 and having thereon a plurality of rows of freshly coated chocolate candies. The number of longitudinal rows of candies moving with the conveyer may be varied as desired and as the rows may be changed, the stringing mechanism which will hereinafter be described, may likewise be adjusted to be in alignment with the rows of on-coming candies. The candies, after being decorated in the manner to be described, continue on the conveyer belt to the cooling room where the chocolate hardens and the patterns become set.

The decorating or stringing operation is achieved by continuously raising and lowering a plurality of stringing elements 10 which are in alignment with the on-coming rows of chocolates 8 so that these elements at the bottom of their downward movement engage the soft tops of the chocolates with uniform pressure to implant therein a pattern determined by the configuration of the lower end of the stringing element. In Figs. 1, 2, 4 and 5, the stringing element is shown in the form of a pair of crossed blades. In Fig. 6 the stringing element constitutes a plurality of balls 12 loosely mounted in a channel 14. In Fig. 7 the stringing element is in the form of a short section of a cylinder 16. In Fig. 8 the stringing element is roughly in the shape of an inverted stringing letter S as at 18.

From the foregoing, it will be understood that the stringing elements may assume any number of different patterns and accordingly when reference is made to the stringing element, such term includes any formation which, when in engagement with the top of a candy coated with soft chocolate or other deformable confection, will produce some sort of pattern.

The mechanism by which the stringing elements are applied to the chocolate will now be explained. There are two side frames 20 and 22 which are attached to the table over which the conveyer belt 4 passes. These side frames are rigidly secured together by the bracing members 24 and 26 and which for convenience, constitute the pipes 28 and 30 and the interior tension bars 32 and 34 threaded at their ends to receive the nuts 36. Another cross-bar 38 is provided through which extend wires 40 coming from the switch box 42 wherein the switch 44 is used to start and stop the motor that drives the mechanism.

Referring to Fig. 2 which is a view in elevation looking from the right of Fig. 1, it will be seen that side frame 22 has a longitudinally adjustable bracket 46 mounted thereon on which is positioned motor 48 having reduction gearing 50 to drive pulley 52, belt 54, pulley 56 and its shaft 58.

Now referring to Figs. 1 and 3, as well as Fig. 2, there is shown a bracket 60 carrying bearing 62 which supports shaft 58. On the other end of this shaft is mounted cam 64 which as it rotates actuates follower 66 rotatably secured on the end of arm 68. The other end of arm 68 is integral with the collar 70 which is rotatably mounted on shaft 72 which shaft in turn is rotatably carried by bearing 74. A threaded lug 76 is attached to arm 68 and receives therein the screw 78, the upper part of which is threaded into a horizontally extending lug 80 pivotally attached to a short arm 82. Arm 82 is pinned at 84 to shaft 72.

Collar 86, integral with arm 82, collar 70 acting as a bushing and collar 88 also pinned to shaft 72 at 90 together serve to anchor shaft 72 longitudinally in bearing 74.

A spring 92 has its lower end secured by hook 94 to the horizontal portion of bracket 60 and the upper end of the spring is secured to a short horizontal arm 96 which is an extension of the axis of lug 80. Spring 92 acting through arm 82, screw 78 and arm 68 holds the follower in firm engagement with cam 64.

From the foregoing explanation it is believed clear that as cam 64 is rotated by the motor, arm 82 will be positively moved in an oscillating arc, pivoting on shaft 72. The angular relation of arm 82 to arm 68 may be varied by rotating screw 78 to the right or the left to move lugs 76 and 80 together or apart as the case may be. The screw 78 may be locked in position by the wing nut 98.

The angular reciprocation of arm 82 is utilized to impart corresponding angular rotation to the transversely extending shaft 100 which has on one end a square section 102 which fits part way into a correspondingly square hole in the extension 104 of shaft 72.

The opposite end of shaft 100 is carried in a bearing 106 and has secured thereto by a swivel connection 108 the end of screw 110 threaded in the support 112. A crank 114 is affixed to screw 110 so that by rotation of the crank, moving screw to the right or left as desired, shaft 100 as viewed in Fig. 1 may be correspondingly shifted to the right or left. As shown in Fig. 1, the right hand end of squared section 102 is an appreciable distance from the inner end of the square hole in sleeve 104 and shaft 100 may be moved to that extent while remaining in engagement with bearing 106.

It is by means of the adjustment just described that the stringing elements 10 which are related to shaft 100 may be moved laterally to bring them into proper alignment with the oncoming rows of chocolates.

As shown in Figs. 1 and 4 a pair of spaced arms 116 and 118 are mounted on shaft 100 and secured against rotation by the pins 120 and 122 extending through the associated collars 124 and 126. Between the upper ends of the arms 116 and 118 as viewed in Fig. 1 is positioned and secured thereto, a counter-balance 128 of sufficient weight to substantially offset the opposed weight of the stringing elements and associated structure.

At the other ends of arms 116 and 118, see Figs. 1 and 4, are depending links 130 and 132 which are connected to a transversely extending bar 134, the outer ends of which extend through slots 136 and 138 in the side frames and associated guide posts. As levers 116 and 118 are moved up and down by oscillation of shaft 100, bar 134 will be correspondingly reciprocated in a vertical direction, all the while being maintained in horizontal position.

A mounting bar 140 is affixed to the inner face of bar 134 by the bolts 142 and 144. A set screw receiving groove 146 extends longitudinally along the upper face of mounting bar 140. A plurality of horizontally extending arms 148 are mounted on bar 140 by means of screws 150 threaded into the hub portions of the arms and extending into engagement with the groove 146. By loosening set screws 150, the arms 148 may be moved laterally on mounting bar 140 for initial adjustment until brought into alignment with the rows of the oncoming chocolates 8.

The outer end of each bar 148 is vertically slotted as at 152 to receive a transversely extending pin 154 running between the forks 156 and 158 (see Fig. 5) of a depending stem 160 at the bottom of which is the stringing element 10. The loose connection formed by the pin 154 which is movable vertically in slot 152 eliminates the need for accurate vertical adjustment of the arms 148. That is to say, when the stringing elements 10 engage the tops of the candies, any further downward movement of bar 134 and associated arms 148 will have no effect on the stringing elements. The weight of each stringing element will constitute the sole force applied to the top of each candy. Since all of the stringing elements 10 and their associated stems 160 will be of identical weight, it follows that the force supplied to the candies by all of the stringing elements will be uniform. This in turn causes uniform patterns 143 to be produced on the candy tops.

The mounting bar 140 also carries near its ends another pair of arms 162 and 164 that are secured in appropriate positions by set screws 166 and 168. Between the outer ends of bars 162 and 164 extend a pair of rods 170 and 172 rigidly affixed to the arms by nuts as shown. These rods act as stops to prevent the stringing elements 10 from swinging unduly out of their normal position.

Having described the mechanism of the invention, the mode of operation will now be explained. The candies 8, having been arranged in equally spaced rows, approach the stringing mechanism on the belt 4. The switch 44 is closed setting motor 48 in operation. This causes cam 64 to rotate and through the mechanism previously explained the shaft 100 will reciprocate through an arc equal to the arcuate movement of arm 68. This will cause a corresponding angular oscillation of arms 116 and 118 to cause an up and down vertical movement of the stringing elements 10 that will be equal to the up and down movement of the horizontal bar 134.

By adjusting screw 78, the position of the arc described by arms 116 and 118 may be varied so that the extent of the descent of stringing elements 10 can be controlled. In general, the mechanism will be so adjusted that the arms 148 will move downwards somewhat after the stringing elements 10 have come to rest on the tops of the candies as the latter pass thereunder.

If the oncoming rows of candies 8 are not in exact alignment with the stringing elements 10, the crank 114 may be operated to move the stringing elements one way or the other until the alignment is correct.

The spacing of the candies in the individual rows is relatively unimportant for the reason that the stringing elements are being reciprocated vertically considerably faster than the candies are passing horizontally thereunder. In an ordinary situation the stringing elements 10 may reciprocate sixty times while approximately twenty-five candies are passing slowly thereunder. As a result the stringing element 10 will engage each candy at least once and if the candy is not exactly centered when the stringing element comes down, it will be engaged twice with the patterns overlapping. The patterns 143 indicated in Fig. 1 are not as regular or accurate as shown, but are adequate for the purpose intended.

The dimensions of the stringing elements will be such that when considered in relation to the rate of reciprocation each and every candy passing thereunder will be engaged one or more times so that the soft chocolate surface of each candy will be appropriately decorated.

It should be noted that upon the removal of the two bolts 142 and 144, mounting bar 140 and all of the stringing elements affixed thereto may be removed as a unit from the machine. The mounting bar 140 may then be replaced by another mounting bar having another set of stringing elements affixed thereto which may be of the same or of a different pattern. This ready interchangeability of the stringing elements minimizes the shut-down time of the machine when the stringing elements become in need of cleaning or when it is desired to change the pattern.

An examination of Figs. 6, 7 and 8 show three different forms of individual stringing elements which are adapted to be secured to the ends of bars 148. Each of these stringing elements will produce a different recognizable pattern in the soft chocolate surface.

The counter-balancing of the stringing elements by the weight 128 causes the machine to function smoothly and quietly and the cam is so designed to give easy starting and stopping motion at the top and bottom of the stroke of the stringing element. These all combine to produce a machine that may be used with existing conveyer equipment to replace the expensive hand stringing operations now required.

As shown in Fig. 9 a cover 174 may be included for the purpose of carrying heating elements 176 and 178 shown in Fig. 10. The purpose of the heating elements is to keep the chocolate that accumulates on the stringing elements in warm condition thereby minimizing the amount of confection that will build up on the stringing elements. In this way the condition of the stringing elements remains more constant during the stringing operation and the elements when removed may be cleaned more readily if the chocolate is still soft.

The cover 174 is pivoted to the side frames 20 and 22 by the pins 180 and 182 which extend through corresponding holes 184 and 186. The cover is so dimensioned that the outer edge 188 rests on cross bar 30 when the hood is closed.

As shown in Fig. 11 the cover 176 comprises outer and inner walls 190 and 192 with a layer of insulation material 194 therebetween. Asbestos makes a satisfactory insulation material.

The strip heaters 176 and 178 are of conventional construction with a capacity of one hundred and twenty-five watts each. The heater elements are secured to the cover by the bolts 196 and are wired in parallel as shown in Fig. 10. A pilot light 198 also in parallel is included to give an indication to the operator as to the circuit condition.

Switch 200 located in the switch box below switch 44 and shown in Fig. 9 controls the circuit to the heating elements, the wiring extending through the cross bar 38 and being part of the group of wires indicated at 40 and thence through the cable 202 which includes the wires 204 and 206 that lead to the heating elements as shown in Fig. 10.

Power for the motor and heating element circuits is obtained through the wires 208 which are plugged into any convenient outlet.

It is my invention to cover all changes and modifications of the example of the invention herein chosen for purposes of the disclosure which do not constitute departures from the spirit and scope of the invention.

I claim:
1. A confectionary stringing machine comprising in combination a continuously moving conveyor belt carrying thereon a plurality of parallel rows of candies previously treated to be in condition to receive impressions on their upper surfaces, a plurality of individual stringing elements positioned across and directly above said belt and in alignment with the said rows of candies to which impressions are to be applied and means for reciprocating said elements up and down at a speed and to an extent that each candy passing thereunder on said belt will be engaged at least once by one of said reciprocating elements.

2. A confectionary stringing machine as set forth in claim 1, and each of said elements being supported by an individual arm, said arms being affixed to a single removable mounting bar, whereby all elements may be removed from said machine simultaneously by the removal of said mounting bar.

3. A confectionary stringing machine as set forth in claim 2, said elements being individually laterally adjustable on said mounting bar whereby said elements may be spaced on said bar according to the spacing of said rows of candies.

4. A confectionary stringing machine as set forth in claim 2, and a loose connection between each said arm and the element carried thereby, whereby said arm may move downwardly a further distance after said element has engaged a candy and whereby the pressure of said element on said candy will be no more than the weight of said element.

5. A confectionary stringing machine as set forth in claim 1, said elements being fixed with respect to a transversely extending bar and said reciprocating means acting to move said bar in a vertical plane whereby the path of movement of said elements will be vertical.

6. A confectionary stringing machine as set forth in claim 5, and means for shifting said bar and elements transversely while said elements are in operation, thereby to align said elements more accurately with said rows of candies.

7. A confectionary stringing machine as set forth in claim 1 and a heating element positioned to direct heat at said stringing elements thereby to keep the candy that may accumulate on said stringing elements in more fluid condition.

8. A confectionary stringing machine as set forth in claim 7, said heating element being mounted on the under side of a cover extending transversely of said machine over said stringing elements.

9. A confectionary stringing machine adapted to be used with a conveyor belt carrying thereon a plurality of parallel rows of candies in condition to receive impressions on their upper surfaces, said machine comprising in combination a plurality of individual stringing elements arranged to be positioned across and directly above the said belt with which said stringing machine is to be used, said stringing elements being in alignment with the said rows of candies to which impressions are to be applied and means for reciprocating said elements up and down at a speed and to an extent that each candy passing thereunder on said belt will be engaged at least once by one of said reciprocating elements, said reciprocating means comprising a shaft oscillating about its longitudinal axis through an arc, arms on said shaft positioned to have their ends move up and down as said shaft oscillates, a transverse horizontal bar carried by said arms, a mounting bar removably affixed to said horizontal bar, a plurality of element-carrying arms extending from said mounting bar in alignment with said rows of candies, said stringing elements pivoted to and depending from said element-carrying arms.

10. A confectionary stringing machine as set forth in claim 9, and a counter-balance carried by said shaft to offset the weight of those members that are actuated by said shaft.

11. A confectionary stringing machine adapted to be used with a conveyor belt carrying thereon a plurality of parallel rows of candies in condition to receive impressions on their upper surfaces, said machine comprising in combination a plurality of individual stringing elements arranged to be positioned across and directly above the said belt with which said stringing machine is to be used, said stringing elements being in alignment with the said rows of candies to which impressions are to be applied and means for reciprocating said elements up and down at a speed and to an extent that each candy passing thereunder on said belt will be engaged at least once by one of said reciprocating elements, said reciprocating means comprising a motor driven cam, a lever oscillated by said cam, a shaft oscillated by said lever, spaced arms on said shaft, a horizontal bar carried by said spaced arms, a mounting bar removably affixed to said horizontal bar, a plurality of element-carrying arms extending from said mounting bar and individually laterally adjustable thereon, said stringing elements pivoted to and depending from said element-carrying arms and means for moving said shaft, horizontal bar, mounting bar and stringing elements laterally a limited distance while said machine is running.

12. A confectionary stringing machine as set forth in claim 1, said stringing elements being pivotally mounted whereby during the time each stringing element is in contact with a candy it may move with said candy until separated therefrom.

References Cited in the file of this patent
UNITED STATES PATENTS

| | | |
|---|---|---|
| 996,479 | Fuller | June 27, 1911 |
| 1,148,793 | Panonlias | Aug. 3, 1915 |
| 1,880,065 | Arpin | Sept. 27, 1932 |
| 1,911,875 | Bausman | May 30, 1933 |
| 2,191,268 | Zuen | Feb. 20, 1940 |